(12) United States Patent
Lei et al.

(10) Patent No.: US 11,614,540 B2
(45) Date of Patent: Mar. 28, 2023

(54) METHOD AND APPARATUS FOR CONTROLLING SOUND BOX

(71) Applicant: Beijing Xiaomi Mobile Software Co., Ltd., Beijing (CN)

(72) Inventors: Yanbing Lei, Beijing (CN); Ruifeng Feng, Beijing (CN); Weiyang Chen, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 839 days.

(21) Appl. No.: 16/557,136

(22) Filed: Aug. 30, 2019

(65) Prior Publication Data
US 2020/0166639 A1    May 28, 2020

(30) Foreign Application Priority Data
Nov. 26, 2018 (CN) .......................... 201811418401.3

(51) Int. Cl.
| | | |
|---|---|---|
| *G01S 15/58* | (2006.01) | |
| *G01S 7/539* | (2006.01) | |
| *G01S 15/52* | (2006.01) | |
| *H04R 1/34* | (2006.01) | |

(52) U.S. Cl.
CPC ............ *G01S 15/582* (2013.01); *G01S 7/539* (2013.01); *G01S 15/52* (2013.01); *H04R 1/342* (2013.01)

(58) Field of Classification Search
CPC ....... H04R 1/342; H04R 3/005; G01S 15/582; G01S 7/539; G01S 15/52; G01S 15/42; G01S 15/526; G01S 15/66; G01S 15/88; G06F 3/017; H04B 11/00; G05B 15/02; G05B 19/418; G05B 2219/2642; G01K 11/341; H04M 3/56

USPC ........................................................... 73/597
See application file for complete search history.

(56) References Cited

U.S. PATENT DOCUMENTS

| | | |
|---|---|---|
| 2014/0306936 A1 | 10/2014 | Dahl et al. |
| 2015/0268341 A1 | 9/2015 | Kyrtsos et al. |
| 2016/0091308 A1 | 3/2016 | Oliaei |
| 2016/0345113 A1 | 11/2016 | Lee et al. |
| 2017/0052596 A1 | 2/2017 | Li |
| 2018/0018965 A1 | 1/2018 | Daley |

FOREIGN PATENT DOCUMENTS

| | | |
|---|---|---|
| CN | 1667532 A | 9/2005 |
| CN | 102937832 A | 2/2013 |
| CN | 103038725 A | 4/2013 |
| CN | 103226386 A | 7/2013 |

(Continued)

OTHER PUBLICATIONS

European Office Action dated Jan. 5, 2022, from the European Patent Office issued in European Application No. 19210148.3.

(Continued)

*Primary Examiner* — Daniel L Murphy
(74) *Attorney, Agent, or Firm* — Finnegan, Henderson, Farabow, Garrett & Dunner, L.L.P.

(57) ABSTRACT

A method for controlling a sound box, includes: in response to the sound box being in a standby state, emitting an ultrasonic signal, and receiving a reflected ultrasonic signal reflected by an external object; acquiring a moving trajectory of the external object according to the reflected ultrasonic signal; and determining a target operation instruction to be executed according to the moving trajectory of the external object.

17 Claims, 8 Drawing Sheets

(56) References Cited

FOREIGN PATENT DOCUMENTS

| CN | 103543834 A | 1/2014 |
| CN | 103885590 A | 6/2014 |
| CN | 100334513 C | 9/2015 |
| CN | 104898844 A | 9/2015 |
| CN | 105183245 A | 12/2015 |
| CN | 105744434 A | 7/2016 |
| CN | 105992080 A | 10/2016 |
| CN | 106406524 A | 2/2017 |
| CN | 106842972 A | 6/2017 |
| CN | 106897018 A | 6/2017 |
| GB | 2493277 A | 1/2013 |
| JP | 2011209773 A | 10/2011 |
| JP | 2013-69224 | 4/2013 |
| JP | 2013536493 A | 9/2013 |
| JP | 2016212887 A | 12/2016 |
| RU | 2264974 C2 | 11/2005 |
| RU | 2576343 C2 | 2/2016 |
| RU | 2591026 C2 | 7/2016 |

OTHER PUBLICATIONS

International Search Report of PCT Application No. PCT/CN2018/123528 from CNIPA, dated Jul. 26, 2019.
Extended European Search Report dated Apr. 30, 2020, in counterpart European Application No. 19210148.3.
Wenjie Ruan et al., "AudioGest: Enabling Fine-Grained Hand Gesture Detection by Decoding Echo Signal", UBICOMP '16, Sep. 12-16, 2016, Heidelberg, Germany.
Hiroki Watanabe et al., "Improving Ultrasound-based Gestrue Recognition Using a Partially Shielded Single Microphone", Lightslink, ISWC '18, Oct. 8-12, 2018, Singapore, Singapore.
Sidhant Gupta et al., "SoundWave: Using the Doppler Effect to Sense Gestures", CHT '12, May 5-10, 2012, Austin, Texas, USA.

METHOD AND APPARATUS FOR CONTROLLING SOUND BOX

CROSS-REFERENCE TO RELATED APPLICATION

This application is based upon and claims priority to Chinese Patent Application No. 201811418401.3 filed on Nov. 26, 2018, which is incorporated herein by reference in its entirety.

TECHNICAL FIELD

The present disclosure relates to the technical field of terminal control, and more particularly to a method and an apparatus for controlling a sound box.

BACKGROUND

With the continuous improvement of smart home technology, the utilization of smart homes is getting increasingly higher. For example, smart sound boxes, smart lights, smart refrigerators, smart water heaters, smart TVs, etc. all bring great convenience to people's lives. Among them, the smart sound box is gradually favored by the majority of users because it can connect multiple smart home devices and recognize the user's voice instructions to realize the voice control of smart home devices.

SUMMARY

According to a first aspect of embodiments of the present disclosure, there is provided a method for controlling a sound box, including: in response to the sound box being in a standby state, emitting an ultrasonic signal, and receiving a reflected ultrasonic signal reflected by an external object; acquiring a moving trajectory of the external object according to the reflected ultrasonic signal; and determining a target operation instruction to be executed according to the moving trajectory of the external object.

According to a second aspect of the embodiments of the present disclosure, there is provided an apparatus for controlling a sound box, including: a processor; and a memory for storing instructions executable by the processor, wherein the processor is configured to: in response to the sound box is in a standby state, emit an ultrasonic signal, and receive a reflected ultrasonic signal reflected by an external object; acquire a moving trajectory of the external object according to the reflected ultrasonic signal; and determine a target operation instruction to be executed according to the moving trajectory of the external object.

According to a third aspect of the embodiments of the present disclosure, there is provided a computer readable storage medium having stored thereon computer instructions that, when executed by a processor of a device, cause the device to perform a method for controlling a sound box, including: in response to the sound box being in a standby state, emitting an ultrasonic signal, and receiving a reflected ultrasonic signal reflected by an external object; acquiring a moving trajectory of the external object according to the reflected ultrasonic signal; and determining a target operation instruction to be executed according to the moving trajectory of the external object.

It should be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the specification, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The technical solution provided by the embodiment of the present disclosure relates to a smart sound box, which is provided with a speaker and a microphone. In the related art, the smart sound box can be controlled by voice or an external remote controller, and the control mode is relatively simple, not suitable for users with blind or sound disabilities, and the user experience is poor. In the technical solution provided by the embodiment of the present disclosure, a sound box can recognize a moving trajectory of an external object through a reflected ultrasonic signal, and further determine a target operation instruction to be executed according to the moving trajectory, so that the user can control the sound box through movement of the body, without an external active remote controller. It can improve convenience and flexibility for the user to control the sound box, thereby increasing the applicable population of the sound box. In addition, the sound box can send ultrasonic waves through its own speaker, and receive the ultrasonic signal reflected by the external object through a built-in microphone. That is, the user does not need to add additional equipment to the sound box to control the sound box, which can reduce the cost for controlling the sound box.

Figure 1A:
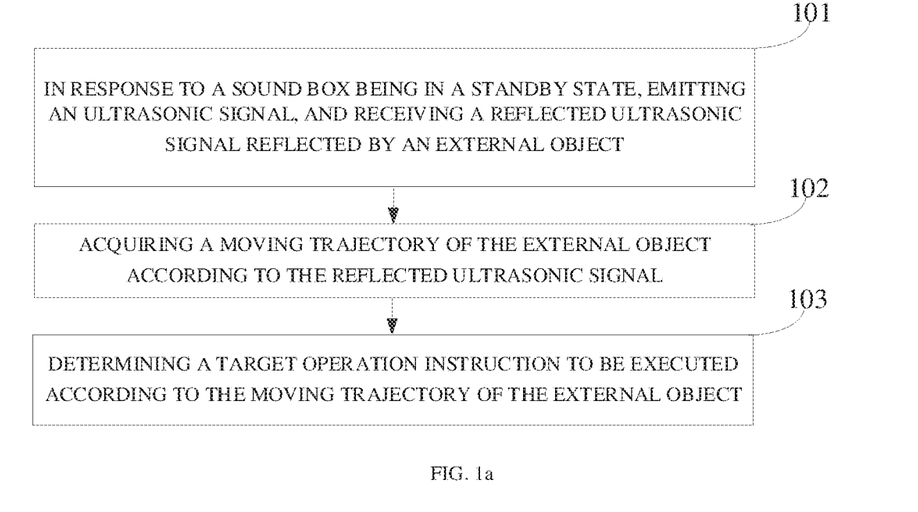
FIG. 1a is a flow chart showing a method for controlling a sound box according to an exemplary embodiment.

FIG. 1a is a flowchart of a method for controlling a sound box according to an exemplary embodiment. The method is applied to a sound box. As shown in FIG. 1a, the method for controlling a sound box includes the following steps 101 to 103.

In step 101, in response to a sound box being in a standby state, an ultrasonic signal is emitted, and a reflected ultrasonic signal reflected by an external object is received.

For example, the sound box is provided with a speaker and a microphone, wherein the speaker is configured to play an audio signal and the microphone is configured to receive an audio signal. Normally, if the sound box is in the standby state, the speaker is turned off, the microphone is in the listening state and acquires the surrounding ambient sound in real time, and the sound box determines whether the ambient sound acquired by the microphone includes a voice instruction.

In an embodiment of the present disclosure, when the sound box is in the standby state, the speaker of the sound box can be controlled to emit an ultrasonic signal, and the microphone of the sound box is controlled to receive the ultrasonic signal reflected by an external object. Further, when the sound box is in the standby state, the sound box can control the speaker to continuously transmit an ultrasonic signal to the outside. The ultrasonic signal is reflected by the external object of the sound box during the propagation process, and the reflected ultrasonic signal after the reflection can be re-transmitted to the vicinity of the sound box, and be received by the microphone of the sound box.

In an embodiment, the speaker of the sound box can emit audio signals from 20 Hz to 40 KHz. The human ear can hear audio signals with frequencies from 20 Hz to 20 KHz, and generally cannot hear audio signals with frequencies from 20 KHz to 40 KHz. The audio signal from 20 KHz to 40 KHz is the ultrasonic signal.

For example, during the standby state of the sound box, the speaker can be controlled to continuously transmit the ultrasonic signal of the same frequency. For example, the sound box can control the speaker to continuously transmit ultrasonic signals of 30 kHz, and control the microphone to continuously receive ultrasonic signal reflected by the external object.

In step 102, a moving trajectory of the external object is acquired according to the reflected ultrasonic signal.

At the time of initialization, it is assumed that a plurality of external objects exist in a current environment in which the sound box is located and remain stationary with respect to the sound box. At this time, the sound box instructs the speaker to emit ultrasonic signals in all directions. The ultrasonic signals, when being transmitted, are reflected by the plurality of external objects exist in the current environment, to form a plurality of reflected ultrasonic signals, which are received by the microphone of the sound box when transmitted to the vicinity of the sound box. Since the plurality of external objects and the sound box are relatively stationary, the frequency of the plurality of reflected ultrasonic signals received by the microphone is the same as the frequency of the ultrasonic signals emitted by the sound box. At this time, the sound box can determine the position of the external object corresponding to each reflected ultrasonic signal and the distance between the external object and the sound box according to a receiving angle, a receiving time and an energy amount of each of the reflected ultrasonic signals, in turn, to determine the arrangement of the plurality of external objects in the current environment. For example, the external object may be furniture or an ornament provided in the current environment, and may be a user present in the current environment or a limb, a hand, or a leg of the user, which will not be limited in the embodiments of the present disclosure.

Taking a first external object as an example, if the first external object of the plurality of external objects moves relative to the sound box, the frequency of the reflected ultrasonic signal by the external object may be different from that of the ultrasonic signal emitted by the speaker due to the Doppler Effect. Assuming that the moving speed of the first external object is v, the propagation speed of the acoustic wave in the air medium is v0, and the frequency of the ultrasonic signal transmitted by the speaker is F0, the frequency F of the reflected ultrasonic signal formed by reflection on the first external object and received by the microphone at a first time when the first external object appears to move can be referred to the following formula (1) and formula (2):

$$F=F0*(v+v0)/v \quad (1)$$

$$F=F0*(v-v0)/v \quad (2)$$

It can be seen from the above formula that the sound box can calculate the moving direction of the first external object at the first time according to the difference between the frequency F of the received reflected ultrasonic signal and F0. For example, if the difference between the frequency F of the reflected ultrasonic signal and F0 is greater than 0, it means that the first external object moves in a direction toward the sound box; if the difference between the frequency F of the reflected ultrasonic signal and F0 is less than 0, it means that the first external object is moving in a direction away from the sound box. According to the value of the frequency F of the reflected ultrasonic signal, the moving speed v of the first external object at the first time can be calculated through the formula (1) or the formula (2). For example, if the difference between the frequency F of the reflected ultrasonic signal and F0 is greater than 0, the moving speed v of the first external object at the first time can be calculated by referring to the formula (1); if the difference between the frequency F of the reflected ultrasonic signal and F0 is less than 0, then the moving speed v of the first external object at the first time can be calculated by referring to the formula (2). After acquiring the moving speed v and the moving direction of the first external object at the first time, the sound box can calculate the moving trend of the first external object, and estimate, for the first external object, a possible angle at which the reflected ultrasonic signal may appear at a next time, that is, the second time, according to the moving trend. At this time, the sound box can instruct the microphone to preferentially monitor at the angle, and determine whether the microphone receives, at the second time, a reflected ultrasonic signal matching the moving trend at the angle. If such reflected ultrasonic signal is received, it indicates that the first external object moves along the estimated moving trend, and then the moving trend of the first external object at the second time will be further estimated in the same way. If no such reflected ultrasonic signal is received, the sound box may first obtain a reflected ultrasonic signal formed by reflection on the first external object among the plurality of reflected ultrasonic signals received at the second time, and further estimate a moving trend of the first external object at the second time according to the reflected ultrasonic signal formed by reflection on the first external object at the second time. The process goes so forth so on, the sound box can finally obtain the moving trend of the first external object at each time, and can determine the moving trajectory of the first external object according to the moving trend of the first external object at each time.

For example, the sound box employs a linear transformation algorithm to obtain the moving trajectory of an external object. The sound box can receive a plurality of reflected ultrasonic signals formed by reflection on a plurality of external objects at each of a plurality of different times, and transform the plurality of reflected ultrasonic signals formed by reflection on the plurality of external objects and received at each time into a matrix through the linear transformation algorithm. Then, by comparing the matrices of two adjacent times, the moving trend of the currently moving external object is determined, and then according to moving trends of the external object at a plurality of times, the moving trajectory of the external object can be acquired.

In an embodiment, the sound box receives a plurality of reflected ultrasonic signals formed by reflection on a plurality of external objects in the current environment at an initial time, and transforms the plurality of reflected ultrasonic signals into an initial matrix through the linear transformation algorithm. The initial matrix can mirror the arrangement of the plurality of external objects in the current environment at the initial time. Assuming that the first external object starts to move from the first time, the sound box can receive a plurality of reflected ultrasonic signals formed by reflection on the plurality of external objects at a first time, and transform the plurality of reflected ultrasonic signals into a first-time matrix through the linear transformation algorithm. The first-time matrix is then compared to the initial matrix. Since the reflected ultrasonic signal formed by reflection on the first external object at the first time changes its frequency under Doppler Effect, the first-time matrix has a difference from the elements of the initial matrix, and according to the difference, it can determine the moving trend of the first external object at the first time. Then, the sound box can receive a plurality of reflected ultrasonic signals formed by reflection on a plurality of external objects at a second time, and then transform the plurality of reflected ultrasonic signals into a second-time matrix through the linear transformation algorithm. The second-time matrix is compared with the first-time matrix. Since at the second time, the first external object is still moving, the reflected ultrasonic signal formed by reflection on the first external object at the second time changes its frequency under Doppler Effect, too. If the moving speed and moving direction of the first external object at the second time do not change, the second-time matrix is substantially the same as the first-time matrix, that is, the moving trend of the first external object at the second time is the same as the moving trend of the first external object at the first time. If the moving speed and moving direction of the first external object at the second time have changed, there is a difference between the elements of the second-time matrix and the elements of the first-time matrix, and the moving trend of the first external object at the second time can be determined according to the difference. The process goes so forth so on, the sound box can acquire the moving trend of the first external object at a plurality of different times, and then acquire the moving trajectory of the first external object according to the moving trend of the first external object at a plurality of different times.

In view of the above, step 102 can be implemented as the following steps.

In step 1, a plurality of reflected ultrasonic signals formed by reflection on a plurality of external objects at each of a plurality of different times are received.

In step 2, the plurality of reflected ultrasonic signals received at each time are transformed into a matrix through a linear transformation algorithm.

In step 3, a moving trend of an external object currently moving is determined according to matrices of two adjacent times.

In step 4, a moving trajectory of the external object is acquired according to moving trends of the external object at the plurality of times.

Among them, step 3 can be implemented as the following steps.

In step 31, according to the matrices of two adjacent times, if it is determined that the frequency of the reflected ultrasonic wave formed by reflection on the currently moving external object is greater than the frequency of the ultrasonic wave emitted by the sound box, it is determined that the external object is moving in a direction toward the sound box.

In step 32, if according to the matrices of two adjacent times, it is determined that the frequency of the reflected ultrasonic wave formed by reflection on the currently moving external object is smaller than the frequency of the ultrasonic wave emitted by the sound box, it is determined that the external object is moving in a direction away from the sound box.

In step 33, according to the frequency of the reflected ultrasonic wave formed by reflection on the currently moving external object and the frequency of the ultrasonic wave emitted by the sound box, a moving speed of the external object is acquired.

In step 34, according to the moving direction and the moving speed of the external object, a moving trend of the external object is acquired.

In step 103, a target operation instruction to be executed is determined according to the moving trajectory of the external object.

For example, the sound box can pre-store a correspondence relationship between positions of the external object and operation instructions, and different positions correspond to different operation instructions. During the standby process, the sound box can acquire the moving trajectory of the external object moving in the current environment in real time. In an embodiment, where the first external object is taken as an example, the sound box can acquire the moving trajectory of the first external object, and then according to the moving trajectory of the first external object, determine the current position of the first external object. Then, according to the current position of the first external object, the sound box queries the preset correspondence relationship between positions and operation instructions, and determines an operation instruction corresponding to the current position as the target operation instruction to be executed and executes the target operation instruction. For example, the sound box can determine the initial position of the first external object according to the initial matrix, and acquire the moving trajectory of the first external object when the first external object is moving, the sound box can track the current position of the first external object in real time according to the moving trajectory. Then the sound box can query the preset correspondence relationship between positions and operation instructions according to the current position of the first external object in real time, and determine in real time the operation instruction corresponding to the current position as the target operation instruction to be executed and execute the target operation instruction.

In an embodiment, the correspondence relationship between positions and operation instructions describes different listening operation instructions corresponding to different positions. The different listening operation instructions instruct the microphone to preferentially listen to audio signals at different positions. When the sound box determines that there is a moving first external object in the current environment, since the first external object is continuously moving, the first external object is likely to be a user. Accordingly, the sound box can acquire the moving trajectory of the user in real time. Then, the sound box determines the current position of the user in real time, and by querying the correspondence relationship between positions and operation instructions, determines a listening operation instruction indicating preferentially listening to the audio signal from the current position of the user as the target operation instruction to be executed and executes the target operation instruction. In this way, when the user needs to use a voice instruction to control the sound box at the current position, the sound box can obtain the voice instruction more accurately due to the preferential listening of the sound box, and it can improve the effectiveness of the user voice operation. For example, the preferential listening of the sound box can be implemented by a beamforming algorithm. If the sound box needs to preferentially listen to a first position of the user, the beamforming algorithm can enhance the sound information received by the microphone at the receiving angle of the first position, i.e., increase the sound intensity of the sound information received at the receiving angle. It can ensure that even if the user issues a voice instruction at a small volume at the first position, the voice instruction can be recognized and executed by the sound box.

For example, the sound box can pre-store the correspondence relationship between distances of the external object and operation instructions, and different distances correspond to different operation instructions. During the standby process, the sound box can obtain the moving trajectory of the moving external object in the current environment in real time. In an embodiment, where the first external object is taken as an example, the sound box can acquire the moving trajectory of the first external object, and according to the moving trajectory of the first external object, determine the current position of the first external object. According to the current position of the first external object, the sound box determines a distance between the first external object and the sound box, and then queries the correspondence relationship between distances and operation instructions, and determines an operation instruction corresponding to the distance between the first external object and the sound box as the target operation instruction to be executed and executes the target operation instruction.

In an embodiment, the correspondence relationship between distances and operation instructions describes that a corresponding operation instruction when the distance is less than a preset distance threshold is a lighting instruction. The lighting instruction instructs the sound box to light up a screen. A corresponding operation instruction when the distance is greater than or equal to the preset distance threshold is a turning-off instruction, which instructs the sound box to turn off the screen. When the sound box determines that there is a moving first external object in the current environment, since the first external object is continuously moving, the first external object is likely to be a user. Accordingly, the sound box can acquire the moving trajectory of the user in real time, determine the user's current position in real time, and determine the distance between the user and the sound box in real time according to the user's current position. If the distance is less than the preset distance threshold, the sound box determines the lighting instruction as the target operation instruction and executes the lighting instruction, so that when the user is moving to a position close to the sound box, the screen of the sound box can be automatically lighting up, which is convenient for the user to operate and can improve the user experience. When the distance is greater than or equal to the preset distance threshold, the sound box determines the turning-off instruction as the target operation instruction and executes the turning-off instruction, so that when the user is moving farther away from the sound box, the screen of the sound box can be automatically turned off, which can reduce the power consumption of the sound box.

In an embodiment, when the user is moving around the sound box, there may be some daily actions, such as flipping pages while reading, drinking water, or turning over while sleeping, and in the meantime, some external objects may move due to external forces, such as pages flapping under the action of the wind, the curtains fluttering under the action of the wind. In the above cases, the sound box can detect the moving trajectory of the external object. If every time the sound box obtains the moving trajectory, the sound box determines the target operation instruction to be executed according to the moving trajectory, it may cause the power consumption of the sound box to be large. Therefore, after the sound box obtains the moving trajectory of an external object, the sound box may firstly obtain the displacement of the external object according to the moving trajectory of the external object. Since the displacement due to the daily actions of the user or the movement of the external object due to the external force is relatively small, and the displacement of the user controlling the sound box through the limb movement is relatively large, the sound box can determine whether the displacement of the external object is greater than or equal to a preset threshold. If the displacement of the external object is greater than or equal to a preset threshold, it may be that the user is operating the sound box with limb movement, so the sound box can determine the target operation instruction that the sound box needs to perform according to the moving trajectory. If the displacement of the external object is less than the preset threshold, it indicates that it may be the movement due to the user's daily actions or the movement of the external object due to the external force, so the sound box can ignore the moving trajectory of the external object and continue to listen through the ultrasonic signal.

In the technical solution provided by the embodiment of the present disclosure, the sound box can recognize the moving trajectory of the external object through a reflected ultrasonic signal, and further determine the target operation instruction to be executed according to the moving trajectory, so that the user can control the sound box through movement of the body, without an external active remote controller. It can improve the convenience for the user to control the sound box. In addition, the sound box can send ultrasonic waves through its own speaker, and receive the ultrasonic signal reflected by the external object through the built-in microphone. That is, the user does not need to add additional equipment to the sound box to control the sound box, which can reduce the cost for controlling the sound box.

Figure 1B:
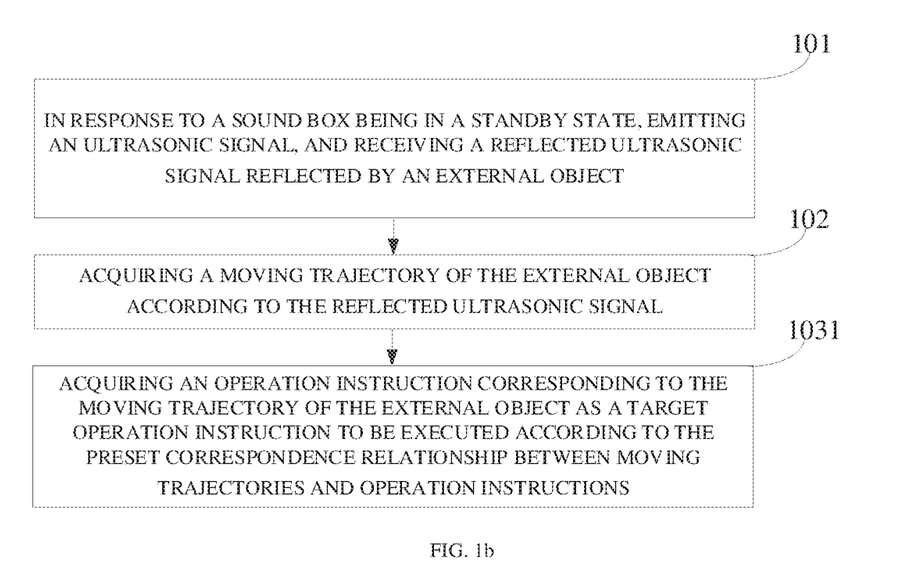
FIG. 1b is a flow chart showing a method for controlling a sound box according to an exemplary embodiment.

In an embodiment, as shown in FIG. 1b, in step 103, determining a target operation instruction that the sound box needs to execute according to the moving trajectory of the external object can be implemented by step 1031.

In step 1031, an operation instruction corresponding to the moving trajectory of the external object is acquired as a target operation instruction to be executed according to the preset correspondence relationship between moving trajectories and operation instructions.

For example, the sound box may pre-store the correspondence relationship between moving trajectories and operation instructions, and the correspondence relationship describes that different moving trajectories correspond to different operation instructions. During the standby process, the sound box can acquire the moving trajectory of the moving external object in the current environment in real time. In an embodiment, where the first external object is taken as an example, the sound box can acquire the moving trajectory of the first external object. Then according to the moving trajectory of the first external object, the sound box queries the correspondence relationship between moving trajectories and operation instructions, and determines an operation instruction corresponding to the moving trajectory of the first external object as the target operation instruction to be executed and executes the target operation instruction. For example, it is assumed that the correspondence relationship between moving trajectories and operation instructions describes that an operation instruction corresponding to moving twice from the same position to a first preset direction is a pause instruction; an operation instruction corresponding to moving twice from the same position to a direction opposite to the first preset direction is a play instruction; an operation instruction corresponding to moving continuously in a second preset direction is a volume increase instruction; and an operation instruction corresponding to moving continuously in a direction opposite to the second preset direction is a volume decrease instruction. If the user intends the sound box to pause the current music, he can swing his hand twice from the same position to the first preset direction. At this time, the sound box can obtain the moving trajectory of the user's hand moving twice from the same position to the first preset position. By querying the correspondence relationship between moving trajectories and operation instructions, the sound box can determine the pause instruction as the target operation instruction to be executed and execute it. For other body movement control, reference may be made to the above process, and the details will not be elaborated in the embodiments of the present disclosure. In this way, the user can control the sound box to pause playing audio through the body movement, which improves the diversity and flexibility of the sound box control, thereby improving the user experience.

In an embodiment, during the process of using the sound box, the user can also define operation instructions corresponding to the body movements. When the user needs to define a new control instruction, the user may input a setting instruction to the sound box, where the setting instruction includes a correspondence relationship between a reference moving trajectory and a reference operation instruction. The sound box may, according to the correspondence relationship between the reference moving trajectory and the reference operation instruction included in the setting instruction, update the correspondence relationship between the moving trajectories and the operation instructions, so that the operation instruction corresponding to the reference moving trajectory in the correspondence relationship between the moving trajectories and the operation instructions is the reference operation instruction. For example, the sound box is provided with an ultrasonic control interface, which is provided with a body movement input button, a plurality of operation instruction options, and a confirmation button. When the user needs to define a new operation instruction, the user can click the body movement input button on the ultrasonic control interface, and at this time, the sound box can play first prompt information and at the same time instruct the speaker to send an ultrasonic signal to instruct the microphone to receive the reflected ultrasonic signal. After hearing the first prompt information, the user can stand in front of the sound box and make an action that needs to be set, for example, raising the hand twice. Then, the sound box can recognize the moving trajectory of the user's hand through the reflected ultrasonic signal formed during the movement of the user's hand and received by the microphone, and record it as a reference moving trajectory. After that, the sound box can play second prompt information, and the second prompt information is used to prompt the user to select an operation instruction corresponding to the reference moving trajectory. After hearing the second prompt information, the user can click to select the desired operation instruction in the plurality of operation instruction options provided on the ultrasonic control interface, and click the confirmation button after the selection is completed. When the confirmation button is clicked, the sound box saves the operation instruction selected by the user as a reference operation instruction corresponding to the reference moving trajectory, and confirms that the setting instruction is acquired. At this time, the sound box can update the correspondence relationship between the moving trajectories and the operation instructions according to the setting instruction. That is, a reference moving trajectory and a reference operation instruction corresponding to the reference moving trajectory are added in the correspondence relationship between the moving trajectories and the operation instructions, or when the reference moving trajectory already exists in the correspondence relationship between the moving trajectories and the operation instructions, the operation instruction corresponding to the reference moving trajectory is replaced with the reference operation instruction.

In the technical solution provided by the embodiment of the present disclosure, after acquiring the moving trajectory, the sound box may determine the target operation instruction to be executed according to the preset correspondence relationship between the moving trajectories and the operation instructions, thereby improving the efficiency and accuracy of acquiring the target operation instruction, which in turn can improve the user experience. In addition, the sound box can send ultrasonic waves through its own speaker, and receive the ultrasonic signal reflected by the external object through a built-in microphone. That is, the user does not need to add additional equipment to the sound box to control the sound box, which can reduce the cost for controlling the sound box.

The implementation process will be described in detail below through several embodiments.

The technical solution provided by the embodiment of the present disclosure may include the following beneficial effects. The sound box can recognize a moving trajectory of an external object through a reflected ultrasonic signal, and further determine a target operation instruction to be executed according to the moving trajectory, so that the user can control the sound box through movement of the body, without an external active remote controller. It can improve the convenience for the user to control the sound box.

Figure 2:
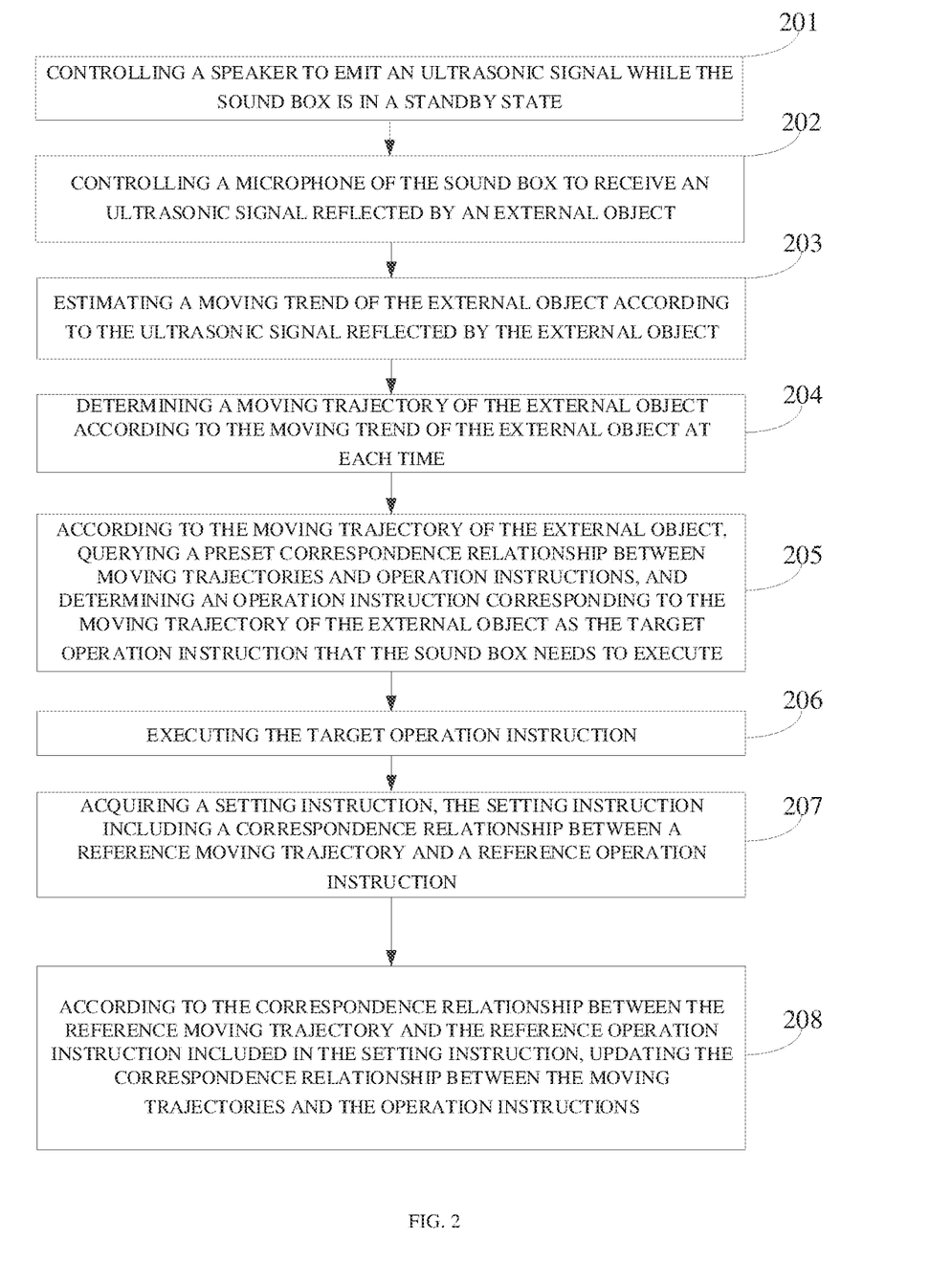
FIG. 2 is a flow chart showing a method for controlling a sound box according to an exemplary embodiment.

FIG. 2 is a flowchart of a method for controlling a sound box according to an exemplary embodiment. The method may be performed by a sound box. As shown in FIG. 2, the method includes the following steps 201 to 208.

In step 201, a speaker is controlled to emit an ultrasonic signal while the sound box is in a standby state.

In step 202, a microphone of the sound box is controlled to receive a reflected ultrasonic signal reflected by an external object.

In step 203, a moving trend of the external object is estimated according to the reflected ultrasonic signal reflected by the external object.

In step 204, a moving trajectory of the external object is determined according to the moving trend of the external object at each time.

In step 205, according to the moving trajectory of the external object, a preset correspondence relationship between moving trajectories and operation instructions is queried, and an operation instruction corresponding to the moving trajectory of the external object is determined as the target operation instruction that the sound box needs to execute.

In step 206, the target operation instruction is executed.

In step 207, a setting instruction is acquired, the setting instruction including a correspondence relationship between a reference moving trajectory and a reference operation instruction.

In step 208, according to the correspondence relationship between the reference moving trajectory and the reference operation instruction included in the setting instruction, the correspondence relationship between the moving trajectories and the operation instructions is updated, so that the operation instruction corresponding to the reference moving trajectory in the correspondence relationship between the moving trajectories and the operation instructions is the reference operation instruction.

The embodiments of the present disclosure provide a method for controlling a sound box, which can recognize a moving trajectory of an external object through a reflected ultrasonic signal, and further determine a target operation instruction to be executed according to the moving trajectory, so that the user can control the sound box through movement of the body, without an external active remote controller. It can improve the convenience for the user to control the sound box. In addition, the sound box can send ultrasonic waves through its own speaker, and receive the ultrasonic signal reflected by the external object through a built-in microphone. That is, the user does not need to add additional equipment to the sound box to control the sound box, which can reduce the cost for controlling the sound box.

The following are apparatus embodiments of the present disclosure, which may be used to implement the method embodiments of the present disclosure.

Figure 3A:
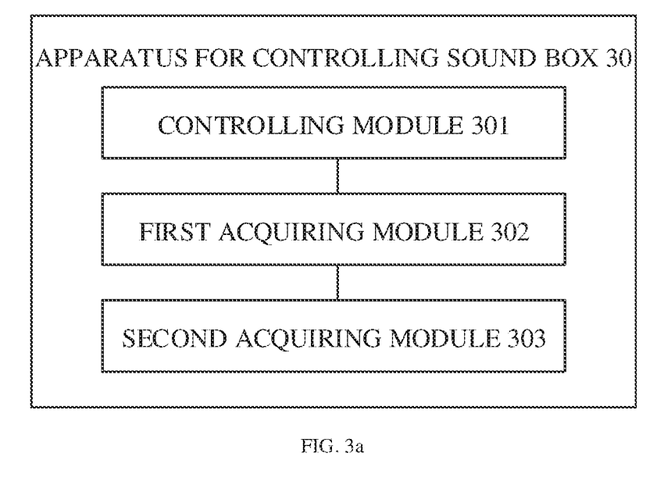
FIG. 3a is a block diagram of an apparatus for controlling a sound box according to an exemplary embodiment.

FIG. 3a is a block diagram of an apparatus 30 for controlling a sound box according to an exemplary embodiment. The apparatus 30 can be implemented as part or all of an electronic device by software, hardware, or a combination of both. As shown in FIG. 3a, the apparatus 30 for controlling a sound box includes a controlling module 301, a first acquiring module 302, and a second acquiring module 303.

The controlling module 301 is configured to, in response to a sound box being in a standby state, emit an ultrasonic signal, and receive a reflected ultrasonic signal reflected by an external object.

The first acquiring module 302 is configured to acquire a moving trajectory of the external object according to the reflected ultrasonic signal.

The second acquiring module 303 is configured to determine a target operation instruction to be executed according to the moving trajectory of the external object.

Figure 3B:
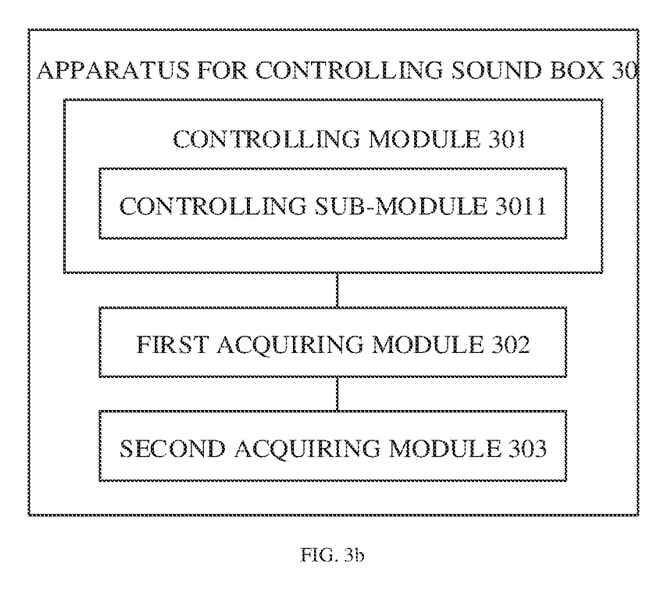
FIG. 3b is a block diagram of an apparatus for controlling a sound box according to an exemplary embodiment.

In one embodiment, as shown in FIG. 3b, the controlling module 301 includes a controlling sub-module 3011.

The controlling sub-module 3011 is configured to, in response to the sound box being in a standby state, control a speaker of the sound box to emit an ultrasonic signal, and control a microphone of the sound box to receive the ultrasonic signal reflected by the external object.

Figure 3C:
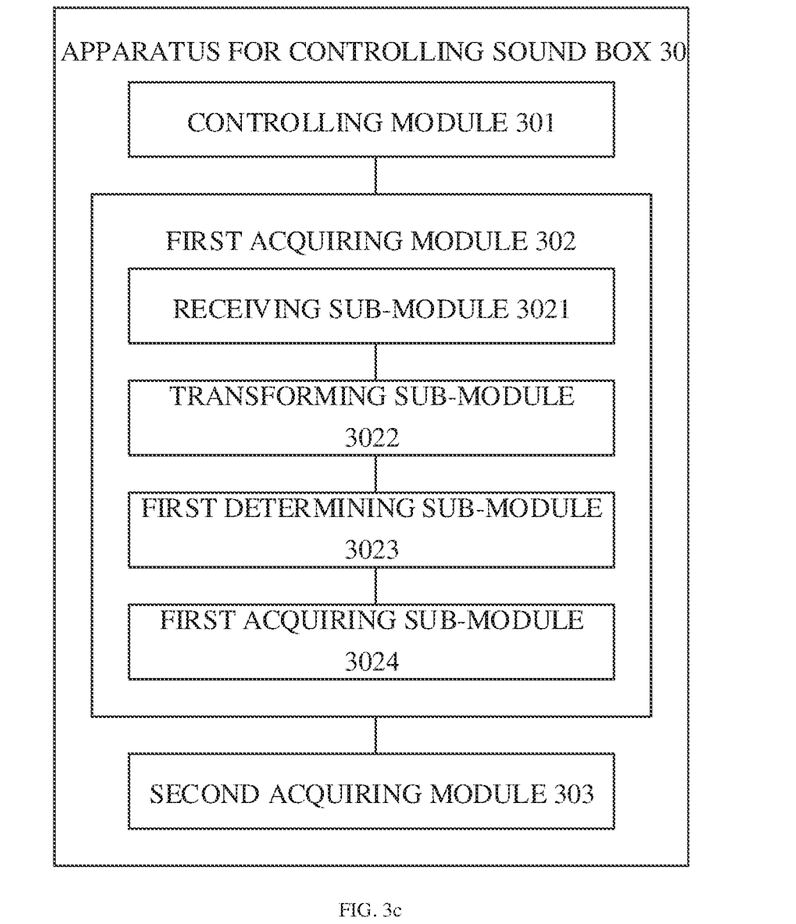
FIG. 3c is a block diagram of an apparatus for controlling a sound box according to an exemplary embodiment.

In one embodiment, as shown in FIG. 3c, the first acquiring module 302 includes a receiving sub-module 3021, a transforming sub-module 3022, a first determining sub-module 3023, and a first acquiring sub-module 3024.

The receiving sub-module 3021 is configured to receive a plurality of reflected ultrasonic signals formed by reflection on a plurality of external objects at each of a plurality of different times.

The transforming sub-module 3022 is configured to transform the plurality of reflected ultrasonic signals received at each time into a matrix through a linear transformation algorithm.

The first determining sub-module 3023 is configured to determine a moving trend of an external object currently moving according to matrices of two adjacent times.

The first acquiring sub-module 3024 is configured to acquire a moving trajectory of the external object according to moving trends of the external object at the plurality of times.

Figure 3D:
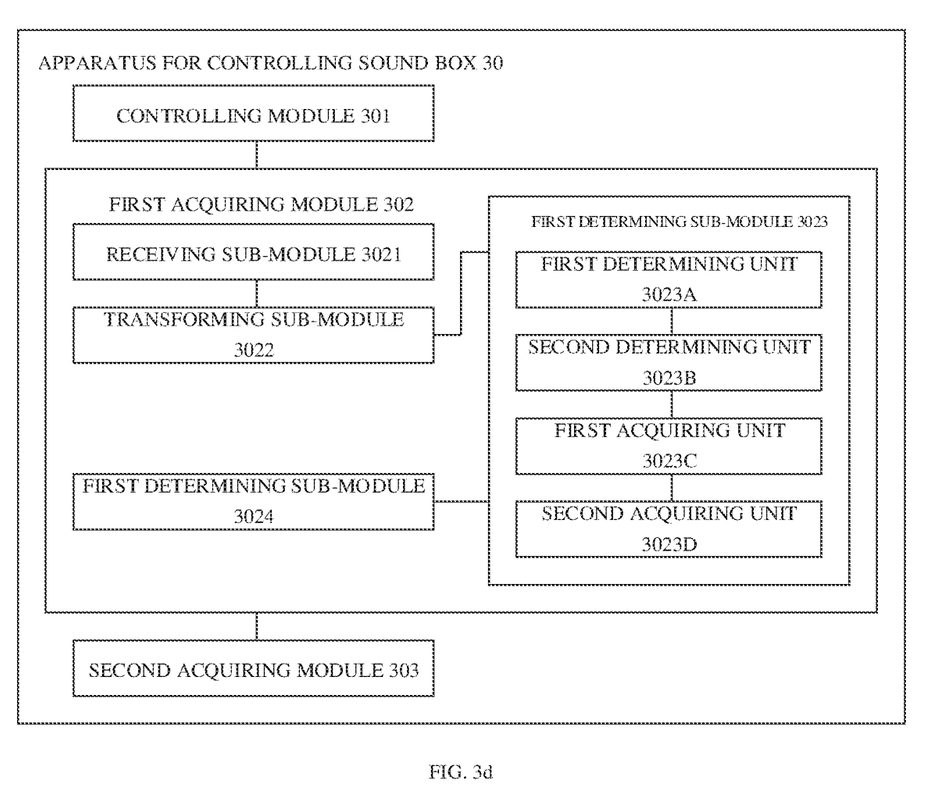
FIG. 3d is a block diagram of an apparatus for controlling a sound box according to an exemplary embodiment.

In one embodiment, as shown in FIG. 3d, the first determining sub-module 3023 includes a first determining unit 3023a, a second determining unit 3023b, a first acquiring unit 3023c, and a second acquiring unit 3023d.

The first determining unit 3023a is configured to, if it is determined, according to matrices of two adjacent times, that a frequency of the reflected ultrasonic wave formed by reflection on the currently moving external object is greater than a frequency of the ultrasonic wave emitted by the sound box, determine that the external object is moving in a direction toward the sound box.

The second determining unit 3023b is configured to, if it is determined, according to matrices of two adjacent times, that a frequency of the reflected ultrasonic wave formed by reflection on the currently moving external object is smaller than a frequency of the ultrasonic wave emitted by the sound box, determine that the external object is moving in a direction away from the sound box.

The first acquiring unit 3023c is configured to acquire a moving speed of the external object according to the frequency of the reflected ultrasonic wave formed by reflection on the currently moving external object and the frequency of the ultrasonic wave emitted by the sound box.

The second acquiring unit 3023d is configured to acquire the moving trend of the external object according to the moving direction and the moving speed of the external object.

Figure 3E:
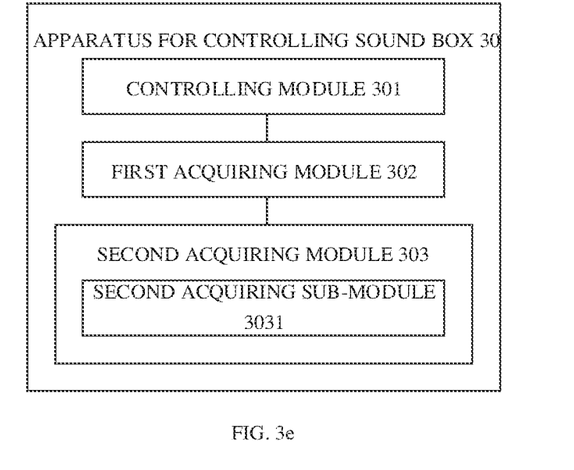
FIG. 3e is a block diagram of an apparatus for controlling a sound box according to an exemplary embodiment.

In one embodiment, as shown in FIG. 3e, the second acquiring module 303 includes a second acquiring sub-module 3031.

The second acquiring sub-module 3031 is configured to acquire an operation instruction corresponding to the moving trajectory of the external object as the target operation instruction to be executed according to a preset correspondence relationship between moving trajectories and operation instructions.

Figure 3F:
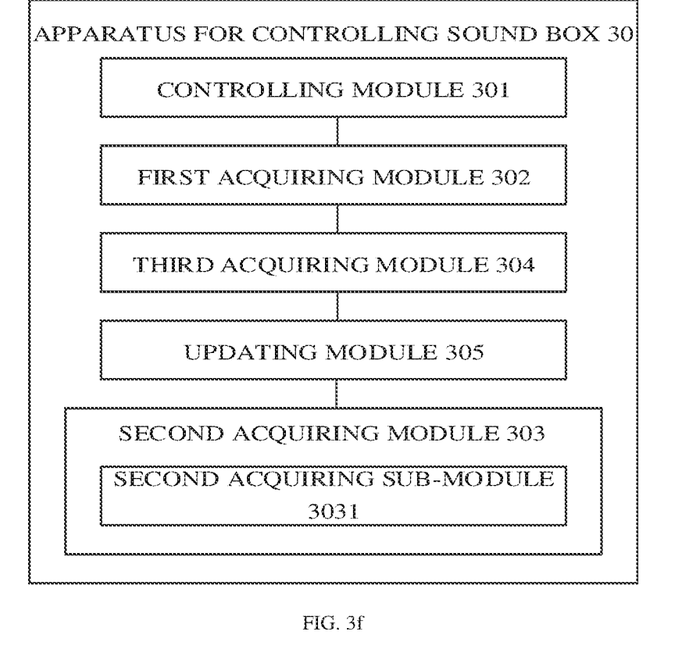
FIG. 3f is a block diagram of an apparatus for controlling a sound box according to an exemplary embodiment.

In one embodiment, as shown in FIG. 3f, the apparatus 30 further includes a third acquiring module 304 and an updating module 305.

The third acquiring module 304 is configured to acquire a setting instruction, the setting instruction including a correspondence relationship between a reference moving trajectory and a reference operation instruction.

The updating module 305 is configured to, according to the correspondence relationship between the reference moving trajectory and the reference operation instruction included in the setting instruction, update the correspondence relationship between the moving trajectories and the operation instructions, so that an operation instruction corresponding to the reference moving trajectory in the correspondence relationship between the moving trajectories and the operation instructions is the reference operation instruction.

Figure 3G:
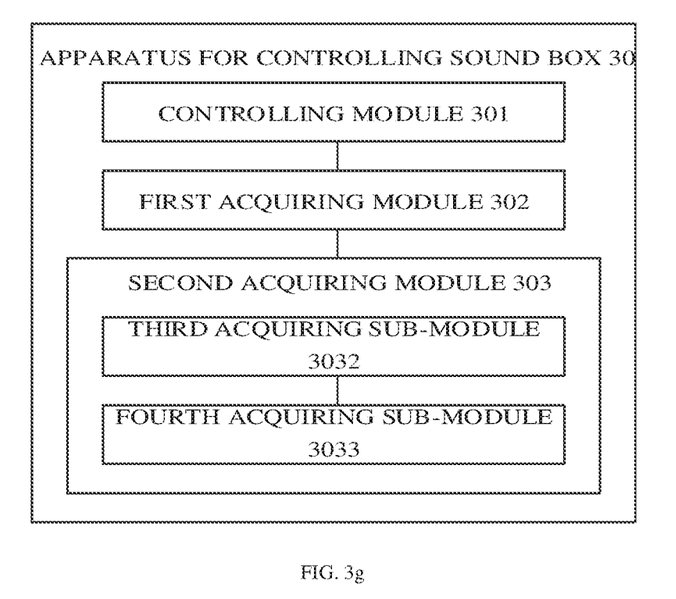
FIG. 3g is a block diagram of an apparatus for controlling a sound box according to an exemplary embodiment.

In one embodiment, as shown in FIG. 3g, the second acquiring module 303 includes a third acquiring sub-module 3032 and a fourth acquiring sub-module 3033.

The third acquiring sub-module 3032 is configured to acquire a current position of the external object according to the moving trajectory of the external object.

The fourth acquiring sub-module 3033 is configured to acquire the target operation instruction to be executed according to the current position of the external object.

Figure 3H:
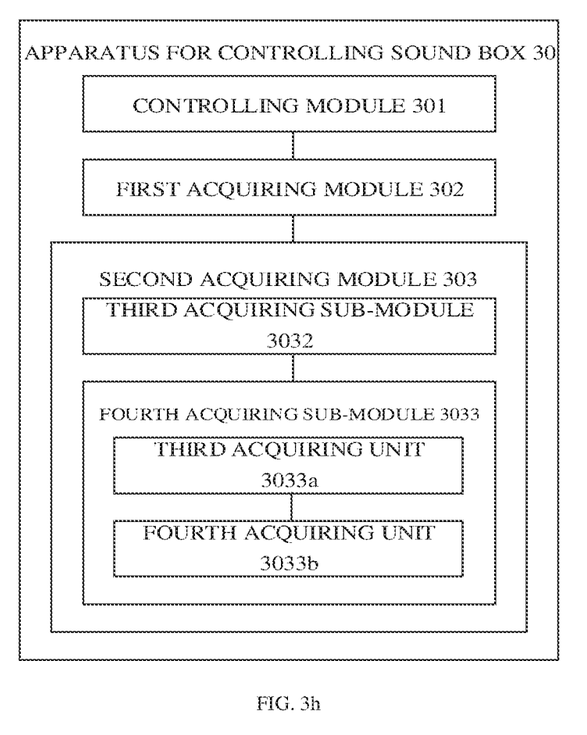
FIG. 3h is a block diagram of an apparatus for controlling a sound box according to an exemplary embodiment.

In one embodiment, as shown in FIG. 3h, the fourth acquiring sub-module 3033 includes a third acquiring unit 3033a and a fourth acquiring unit 3033b.

The third acquiring unit 3033a is configured to acquire a current distance between the external object and the sound box according to the current position of the external object.

The fourth acquiring unit 3033b is configured to acquire the target operation instruction to be executed according to the current distance between the external object and the sound box.

Figure 3I:
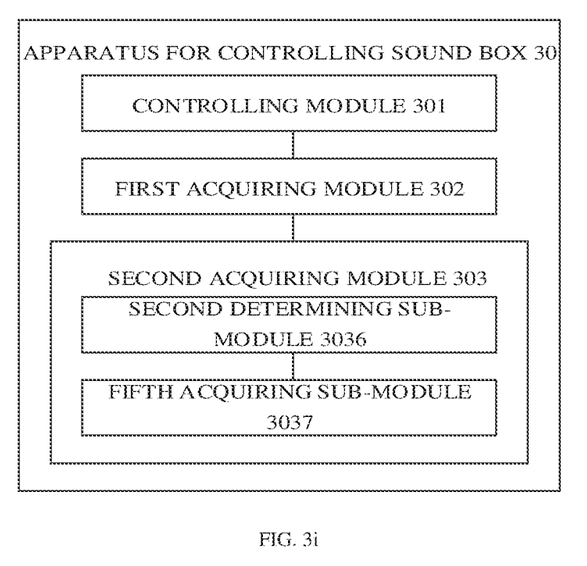
FIG. 3i is a block diagram of an apparatus for controlling a sound box according to an exemplary embodiment.

In one embodiment, as shown in FIG. 3i, the second acquiring module 303 includes a second determining sub-module 3036 and a fifth acquiring sub-module 3037.

The second determining sub-module 3036 is configured to determine whether a displacement of the external object is greater than or equal to a preset threshold according to the moving trajectory of the external object.

The fifth acquiring sub-module 3037 is configured to, if the displacement of the external object is greater than or equal to the preset threshold, acquire the target operation instruction to be executed according to the moving trajectory of the external object.

The embodiments of the present disclosure provide an apparatus for controlling a sound box, which can recognize a moving trajectory of an external object through a reflected ultrasonic signal, and further determine a target operation instruction to be executed according to the moving trajectory, so that the user can control the sound box through movement of the body, without an external active remote controller. It can improve the convenience for the user to control the sound box. In addition, the sound box can send ultrasonic waves through its own speaker, and receive the ultrasonic signal reflected by the external object through a built-in microphone. That is, the user does not need to add additional equipment to the sound box to control the sound box, which can reduce the cost for controlling the sound box.

An embodiment of the present disclosure provides an apparatus for controlling a sound box, the apparatus including: a processor; and a memory for storing instructions executable by the processor, wherein the processor is configured to: in response to a sound box being in a standby state, emit an ultrasonic signal, and receive the ultrasonic signal reflected by an external object; acquire a moving trajectory of the external object according to the reflected ultrasonic signal; and determine a target operation instruction to be executed according to the moving trajectory of the external object.

In one embodiment, the processor is further configured to: when the sound box is in a standby state, control a speaker of the sound box to emit an ultrasonic signal, and control a microphone of the sound box to receive the ultrasonic signal reflected by the external object.

In one embodiment, the processor is further configured to: receive a plurality of reflected ultrasonic signals formed by reflection on a plurality of external objects at each of a plurality of different times; transform the plurality of reflected ultrasonic signals received at each time into a matrix through a linear transformation algorithm; determine a moving trend of an external object currently moving according to matrices of two adjacent times; and acquire a moving trajectory of the external object according to moving trends of the external object at the plurality of times.

In one embodiment, the processor is further configured to: if it is determined, according to matrices of two adjacent times, that a frequency of the reflected ultrasonic wave formed by reflection on the currently moving external object is greater than a frequency of the ultrasonic wave emitted by the sound box, determine that the external object is moving in a direction toward the sound box; if it is determined, according to matrices of two adjacent times, that a frequency of the reflected ultrasonic wave formed by reflection on the currently moving external object is smaller than a frequency of the ultrasonic wave emitted by the sound box, determine that the external object is moving in a direction away from the sound box; acquire a moving speed of the external object according to the frequency of the reflected ultrasonic wave formed by reflection on the currently moving external object and the frequency of the ultrasonic wave emitted by the sound box; and acquire the moving trend of the external object according to the moving direction and the moving speed of the external object.

In one embodiment, the processor is further configured to: acquire an operation instruction corresponding to the moving trajectory of the external object as the target operation instruction to be executed according to a preset correspondence relationship between moving trajectories and operation instructions.

In one embodiment, the processor is further configured to: acquire a setting instruction, the setting instruction including a correspondence relationship between a reference moving trajectory and a reference operation instruction; and according to the correspondence relationship between the reference moving trajectory and the reference operation instruction included in the setting instruction, update the correspondence relationship between the moving trajectories and the operation instructions, so that an operation instruction corresponding to the reference moving trajectory in the correspondence relationship between the moving trajectories and the operation instructions is the reference operation instruction.

In one embodiment, the processor is further configured to: acquire a current position of the external object according to the moving trajectory of the external object; and acquire the target operation instruction to be executed according to the current position of the external object.

In one embodiment, the processor is further configured to: acquire a current distance between the external object and the sound box according to the current position of the external object; and acquire the target operation instruction to be executed according to the current distance between the external object and the sound box.

In one embodiment, the processor is further configured to: determine whether a displacement of the external object is greater than or equal to a preset threshold according to the moving trajectory of the external object; and if the displacement of the external object is greater than or equal to the preset threshold, acquire the target operation instruction to be executed according to the moving trajectory of the external object.

The embodiments of the present disclosure provide an apparatus for controlling a sound box, which can recognize a moving trajectory of an external object through a reflected ultrasonic signal, and further determine a target operation instruction to be executed according to the moving trajectory, so that the user can control the sound box through movement of the body, without an external active remote controller. It can improve the convenience for the user to control the sound box. In addition, the sound box can send ultrasonic waves through its own speaker, and receive the ultrasonic signal reflected by the external object through a built-in microphone. That is, the user does not need to add additional equipment to the sound box to control the sound box, which can reduce the cost for controlling the sound box.

With regard to the apparatus in the above embodiments, the specific manner in which the respective modules perform the operations has been described in detail in the embodiment relating to the method, and will not be explained in detail herein.

Figure 4:
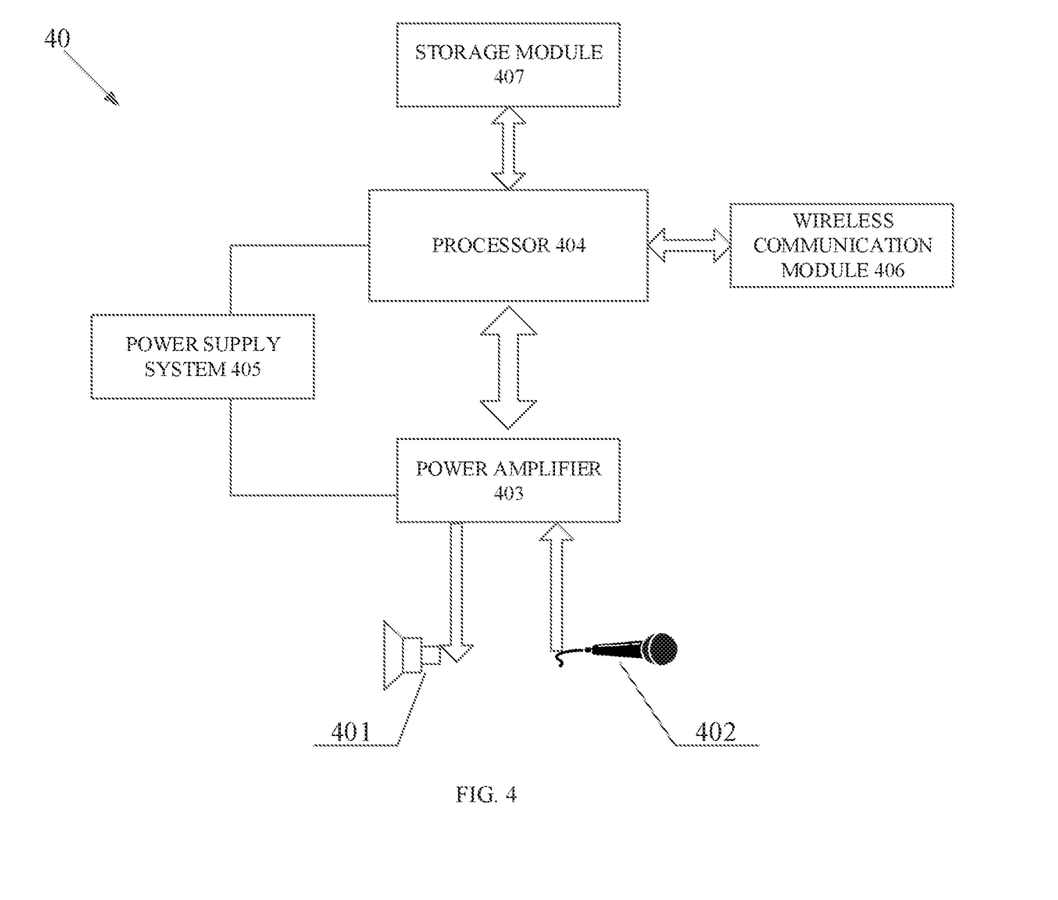
FIG. 4 is a block diagram of a sound box according to an exemplary embodiment.

FIG. 4 is a block diagram of a sound box 40 according to an exemplary embodiment. The sound box 40 includes a speaker 401, a microphone 402, a power amplifier 403 connected to the speaker 401 and the microphone 402, a processor 404, and a power supply system 405, a wireless communication module 406 and a storage module 407. The speaker 401 is configured to play an audio signal. The microphone 402 is configured to receive an audio signal. The power amplifier 403 is configured to amplify an audio signal played by the speaker 401 or received by the microphone 402. The power system 405 is configured to supply power to the speaker 40. The processor 404 is configured to control the overall operation of the sound box 40, and specifically, can execute the control program stored in the storage module 407.

An embodiment of the present disclosure provides a non-transitory computer readable storage medium, when instructions in the storage medium are executed by the processor 404 of the apparatus 40, to cause the apparatus 40 to perform the method for controlling a sound box described above. The method includes: in response to a sound box being in a standby state, emitting an ultrasonic signal, and receiving the ultrasonic signal reflected by an external object; acquiring a moving trajectory of the external object according to the reflected ultrasonic signal; and determining a target operation instruction to be executed according to the moving trajectory of the external object.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. A method for controlling a sound box, comprising:
   in response to the sound box being in a standby state, emitting an ultrasonic signal, and receiving a reflected ultrasonic signal reflected by an external object;
   acquiring a moving trajectory of the external object according to the reflected ultrasonic signal; and
   determining a target operation instruction to be executed according to the moving trajectory of the external object,
   wherein in response to the sound box being in a standby state, emitting an ultrasonic signal, and receiving the reflected ultrasonic signal reflected by the external object comprises:
      in response to the sound box being in a standby state, controlling a speaker of the sound box to emit an ultrasonic signal, and controlling a microphone of the sound box to receive the reflected ultrasonic signal reflected by the external object.

2. The method according to claim 1, wherein acquiring a moving trajectory of the external object according to the reflected ultrasonic signal comprises:
   receiving a plurality of reflected ultrasonic signals formed by reflection on a plurality of external objects at each of a plurality of different times;
   transforming the plurality of reflected ultrasonic signals received at each time into a matrix through a linear transformation algorithm;
   determining a moving trend of an external object currently moving according to matrices of two adjacent times; and
   acquiring a moving trajectory of the external object according to moving trends of the external object at the plurality of times.

3. The method according to claim 2, wherein determining a moving trend of an external object currently moving according to matrices of two adjacent times comprises:
   if it is determined, according to matrices of two adjacent times, that a frequency of the reflected ultrasonic wave formed by reflection on the currently moving external object is greater than a frequency of the ultrasonic wave emitted by the sound box, determining that the external object is moving in a direction toward the sound box;
   if it is determined, according to matrices of two adjacent times, that the frequency of the reflected ultrasonic wave formed by reflection on the currently moving external object is smaller than the frequency of the ultrasonic wave emitted by the sound box, determining that the external object is moving in a direction away from the sound box;
   acquiring a moving speed of the external object according to the frequency of the reflected ultrasonic wave formed by reflection on the currently moving external object and the frequency of the ultrasonic wave emitted by the sound box; and
   acquiring the moving trend of the external object according to the moving direction and the moving speed of the external object.

4. The method according to claim 1, wherein determining a target operation instruction to be executed according to the moving trajectory of the external object comprises:
acquiring an operation instruction corresponding to the moving trajectory of the external object as the target operation instruction to be executed according to a preset correspondence relationship between moving trajectories and operation instructions.

5. The method according to claim 4, further comprising:
acquiring a setting instruction, the setting instruction comprising a correspondence relationship between a reference moving trajectory and a reference operation instruction; and
according to the correspondence relationship between the reference moving trajectory and the reference operation instruction in the setting instruction, updating the correspondence relationship between the moving trajectories and the operation instructions.

6. The method according to claim 1, wherein determining a target operation instruction to be executed according to the moving trajectory of the external object comprises:
acquiring a current position of the external object according to the moving trajectory of the external object; and
acquiring the target operation instruction to be executed according to the current position of the external object.

7. The method according to claim 6, wherein acquiring the target operation instruction to be executed according to the current position of the external object comprises:
acquiring a current distance between the external object and the sound box according to the current position of the external object; and
acquiring the target operation instruction to be executed according to the current distance between the external object and the sound box.

8. The method according to claim 1, wherein determining a target operation instruction to be executed according to the moving trajectory of the external object comprises:
determining whether a displacement of the external object is greater than or equal to a preset threshold according to the moving trajectory of the external object;
if the displacement of the external object is greater than or equal to the preset threshold, acquiring the target operation instruction to be executed according to the moving trajectory of the external object.

9. An apparatus for controlling a sound box, comprising:
a processor; and
a memory for storing instructions executable by the processor,
wherein the processor is configured to:
in response to a sound box being in a standby state, emit an ultrasonic signal, and receive a reflected ultrasonic signal reflected by an external object;
acquire a moving trajectory of the external object according to the reflected ultrasonic signal; and
determine a target operation instruction to be executed according to the moving trajectory of the external object,
wherein in emitting an ultrasonic signal, and receiving the reflected ultrasonic signal reflected by the external object, the processor is further configured to:
in response to the sound box being in a standby state, control a speaker of the sound box to emit an ultrasonic signal, and control a microphone of the sound box to receive the reflected ultrasonic signal reflected by the external object.

10. The apparatus according to claim 9, wherein in acquiring a moving trajectory of the external object according to the reflected ultrasonic signal, the processor is further configured to:
receive a plurality of reflected ultrasonic signals formed by reflection on a plurality of external objects at each of a plurality of different times;
transform the plurality of reflected ultrasonic signals received at each time into a matrix through a linear transformation algorithm;
determine a moving trend of an external object currently moving according to matrices of two adjacent times; and
acquire a moving trajectory of the external object according to moving trends of the external object at the plurality of times.

11. The apparatus according to claim 10, wherein in determining a moving trend of an external object currently moving according to matrices of two adjacent times, the processor is further configured to:
if it is determined, according to matrices of two adjacent times, that a frequency of the reflected ultrasonic wave formed by reflection on the currently moving external object is greater than a frequency of the ultrasonic wave emitted by the sound box, determine that the external object is moving in a direction toward the sound box;
if it is determined, according to matrices of two adjacent times, that the frequency of the reflected ultrasonic wave formed by reflection on the currently moving external object is smaller than the frequency of the ultrasonic wave emitted by the sound box, determine that the external object is moving in a direction away from the sound box;
acquire a moving speed of the external object according to the frequency of the reflected ultrasonic wave formed by reflection on the currently moving external object and the frequency of the ultrasonic wave emitted by the sound box; and
acquire the moving trend of the external object according to the moving direction and the moving speed of the external object.

12. The apparatus according to claim 9, wherein in determining a target operation instruction to be executed according to the moving trajectory of the external object, the processor is further configured to:
acquire an operation instruction corresponding to the moving trajectory of the external object as the target operation instruction to be executed according to a preset correspondence relationship between moving trajectories and operation instructions.

13. The apparatus according to claim 9, wherein the processor is further configured to:
acquire a setting instruction, the setting instruction comprising a correspondence relationship between a reference moving trajectory and a reference operation instruction; and
according to the correspondence relationship between the reference moving trajectory and the reference operation instruction in the setting instruction, update the correspondence relationship between the moving trajectories and the operation instructions.

14. The apparatus according to claim 9, wherein in determining a target operation instruction to be executed according to the moving trajectory of the external object, the processor is further configured to:
acquire a current position of the external object according to the moving trajectory of the external object; and acquire the target operation instruction to be executed according to the current position of the external object.

15. The apparatus according to claim 14, wherein in acquiring the target operation instruction to be executed according to the current position of the external object, the processor is further configured to:
   acquire a current distance between the external object and the sound box according to the current position of the external object; and
   acquire the target operation instruction to be executed according to the current distance between the external object and the sound box.

16. The apparatus according to claim 9, wherein in determining a target operation instruction to be executed according to the moving trajectory of the external object, the processor is further configured to:
   determine whether a displacement of the external object is greater than or equal to a preset threshold according to the moving trajectory of the external object; and
   if the displacement of the external object is greater than or equal to the preset threshold, acquire the target operation instruction to be executed according to the moving trajectory of the external object.

17. A computer readable storage medium having stored thereon computer instructions that, when executed by a processor of a device, cause the device to perform a method for controlling a sound box, the method comprising:
   in response to the sound box being in a standby state, emitting an ultrasonic signal, and receiving a reflected ultrasonic signal reflected by an external object;
   acquiring a moving trajectory of the external object according to the reflected ultrasonic signal; and
   determining a target operation instruction to be executed according to the moving trajectory of the external object,
   wherein in response to the sound box being in a standby state, emitting an ultrasonic signal, and receiving the reflected ultrasonic signal reflected by the external object comprises:
      in response to the sound box being in a standby state, controlling a speaker of the sound box to emit an ultrasonic signal, and controlling a microphone of the sound box to receive the reflected ultrasonic signal reflected by the external object.

\* \* \* \* \*